United States Patent [19]

Kremp et al.

[11] 3,722,828

[45] Mar. 27, 1973

[54] CINEMATOGRAPHIC APPARATUS FOR USE WITH CASSETTES FOR MOTION PICTURE FILM

[75] Inventors: Rudolf Kremp, Ludwig-Thoma-Pl. 3, Grunwald; Fridolin Hennig, Munich, both of Germany

[73] Assignee: Agfa-Gevaert Aktiengesellschaft, Leverkusen, Germany

[22] Filed: May 10, 1971

[21] Appl. No.: 141,825

[30] Foreign Application Priority Data

May 21, 1970 Germany.....................P 20 24 646.2

[52] U.S. Cl..................242/181, 242/198, 274/4 F, 352/74, 352/123
[51] Int. Cl......G03b 1/04, G11b 15/32, G11b 23/04
[58] Field of Search..............242/181, 192, 197–200, 242/205; 352/72–78, 123; 274/4 R, 4 C, 4 D, 11 R, 11 D

[56] References Cited

UNITED STATES PATENTS 3,197,150   7/1965   Camras............................242/181
3,582,082   6/1971   Tagaki et al.........................274/4 R
2,113,845   4/1938   Kleerup..............................242/76 X
3,512,786   5/1970   Ban.....................................274/4 F Primary Examiner—Leonard D. Christian
Attorney—Michael S. Striker

[57] ABSTRACT

A motion picture projector wherein the top wall of the housing supports a detachable upright duct for a stack of horizontal film-containing cassettes. The lowermost cassette of the stack dwells in a projection position in which the film can be automatically withdrawn from such cassette to be threaded through the projector and attached to the core of the takeup reel. An automatic rewinding unit rewinds the film onto the supply reel in the cassette occupying the projection position, and such cassette is thereupon expelled from projection position by a pusher to enter a detachable collecting receptacle. The lowermost cassette of the stack in the duct descends by gravity and occupies the projection position when the pusher returns to its retracted position. The guide means wherein the film passes from the supply reel in the cassette occupying the projection position to the takeup reel in the housing of the projector has a channel which twists the film through 90°.

10 Claims, 3 Drawing Figures

Patented March 27, 1973

INVENTOR
RUDOLF KREMP
FRIDOLIN HENNIG

BY

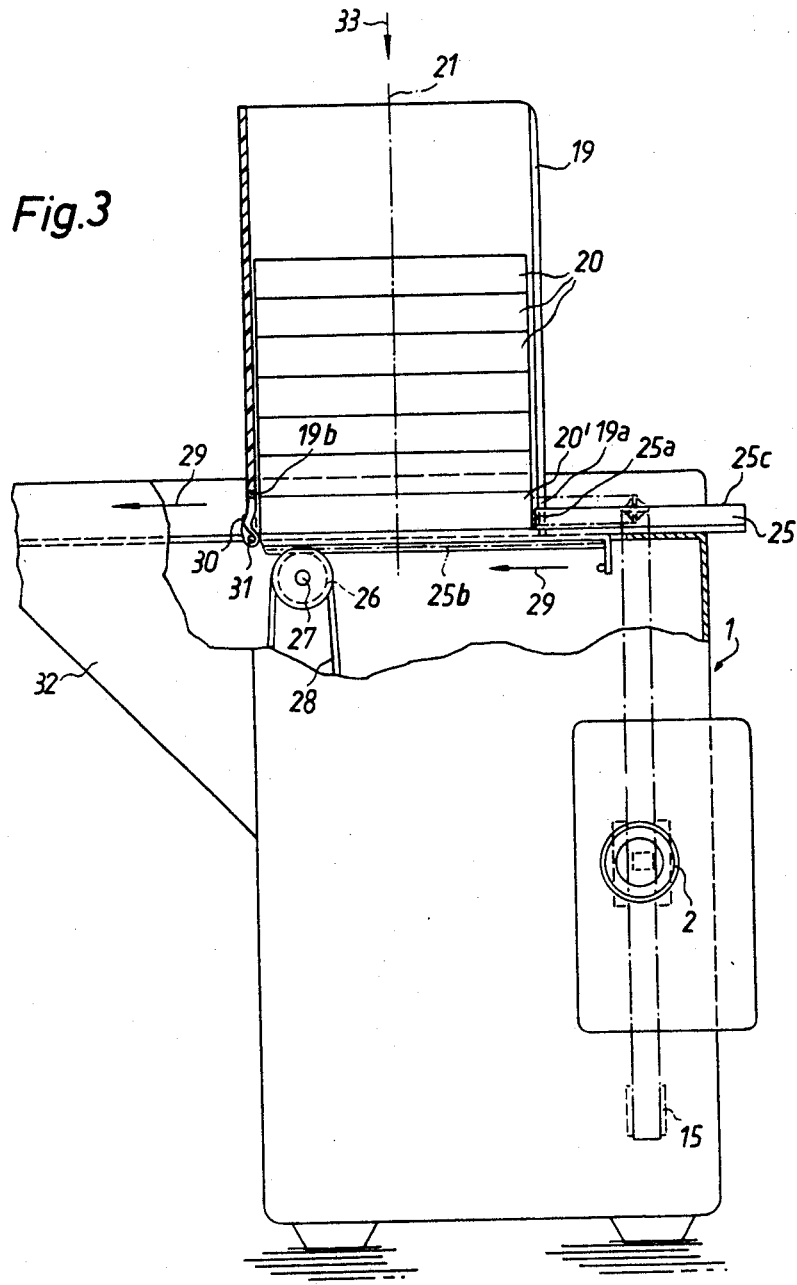

CINEMATOGRAPHIC APPARATUS FOR USE WITH CASSETTES FOR MOTION PICTURE FILM

BACKGROUND OF THE INVENTION

The present invention relates to cinematographic apparatus in general, and more particularly to improvements in motion picture projectors for use with film-containing cassettes. Still more particularly, the invention relates to improvements in projectors which can support and store a series of film-containing cassettes.

It is already known to provide a motion picture projector with a tray or magazine for a set of cassettes which are located in vertical planes and are movable stepwise so that one of the cassettes assumes a projection position in which the film can be withdrawn from its supply reel to be threaded through the projector and attached to the core of the takeup reel. The projector is provided with means for arresting successive cassettes in projection position and with discrete means for moving the cassettes in stepwise fashion so as to advance successive cassettes into the projection position. As a rule, the film is withdrawn from the cassette occupying the projection position and such cassette is thereupon advanced by a step to occupy a rewinding position in which the film is rewound onto its supply reel. The advancing means comprises a pusher which advances the cassettes in a predetermined direction under the action of one or more springs. The bias of such springs decreases as the pusher moves further away from its starting position so that the speed of forward movement of cassettes decreases from step to step. This is highly undesirable, particularly in projectors wherein the movements of cassettes trigger certain operations, such as automatic threading of film, automatic rewinding of film and/or others. Furthermore, such projectors cannot accommodate substantial numbers of cassettes because the stroke of the pusher is rather limited. Were the stroke very long so that the projector could accommodate a substantial number of cassettes, the initial bias of the spring or springs for the pusher would be very high and the bias would decrease to a very small value when the pusher would advance the last cassette of the series to the projection position. The interval required for advancing the foremost cassette of a substantial number of cassettes to projection position would be only a small fraction of the interval which would elapse during transport of the last cassette or cassettes of the series to projection position.

SUMMARY OF THE INVENTION

An object of the invention is to provide a motion picture projector for use with film-containing cassettes wherein the speed at which the foremost cassette of a series advances to projection position is negligibly different from the speed of the last cassette of such series.

Another object of the invention is to provide a motion picture projector wherein the cassettes need not be biased by springs to advance to projection position.

A further object of the invention is to provide novel and improved means for confining a smaller or larger number of cassettes in a motion picture projector of the above outlined character.

An additional object of the invention is to provide a simple, compact, rugged and inexpensive projector for use with film-containing cassettes.

Still another object of the invention is to provide the projector with novel means for expelling successive cassettes from the projection position and with novel means for guiding the film between the supply reel of a cassette which occupies the projection position and the takeup reel.

The invention is embodied in a motion picture projector for use with film-containing cassettes which comprises a preferably box-shaped housing and a confining container which is preferably separably connected with the housing and defines a space for reception and gravitational descent of cassettes to a predetermined projection position. The container is preferably an upright duct which is open at its top to permit insertion of cassettes, and the cassette which occupies the projection position is preferably located in a horizontal plane.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic front elevational view of the projector, with portions of the housing and duct broken away.

DESCRIPTION OF THE PREFERRED EMBODIMENTS

Figure 1:
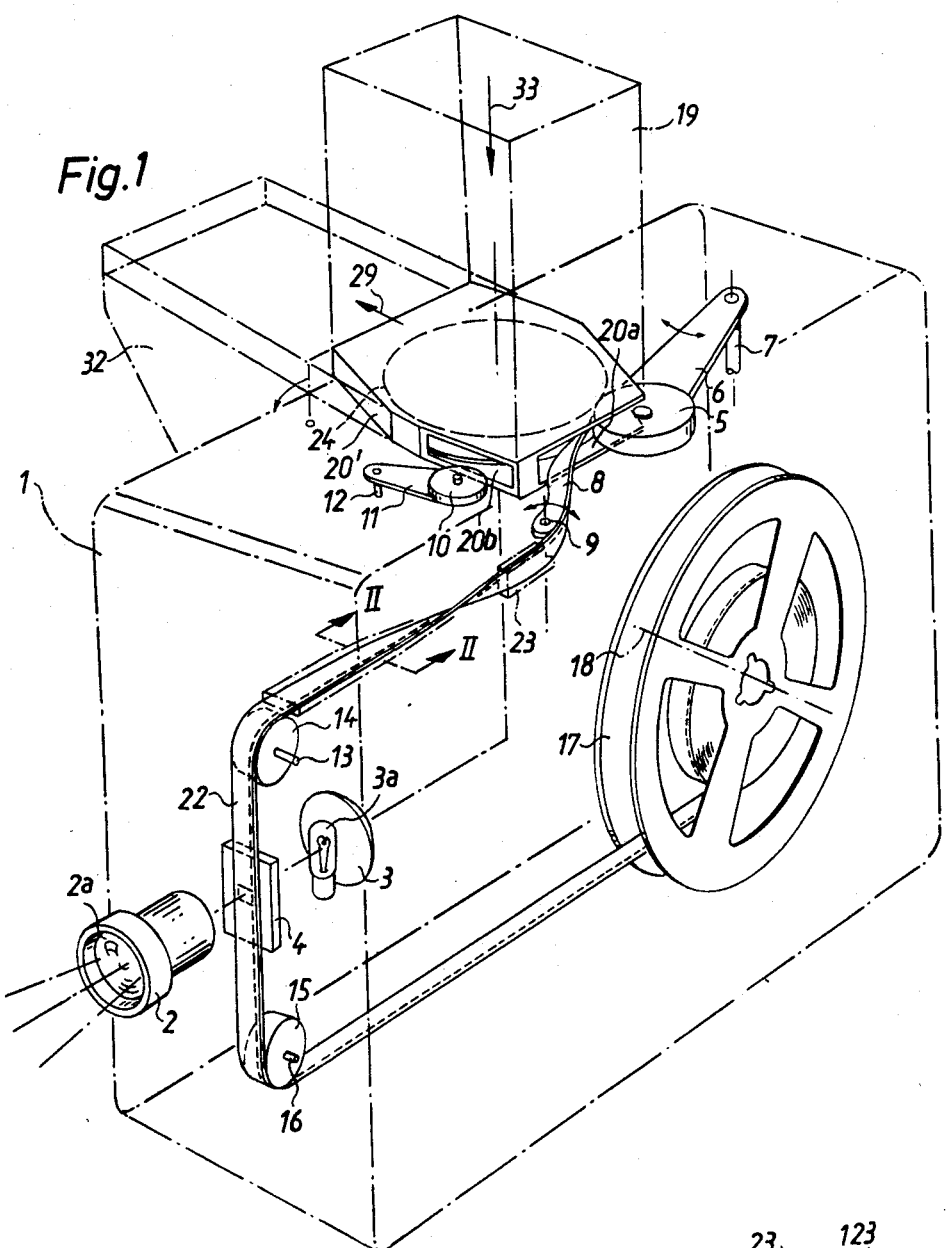
FIG. 1 is a diagrammatic perspective view of a motion picture projector which embodies the invention, a cassette being shown in the projection position.

The motion picture projector which is shown in the drawing comprises a substantially box-shaped housing 1 having a front wall which supports the mount 2 for a projection lens 2a. The lens 2a is located in front of a vertical gate 4 which, in turn, is located in front of a projection lamp 3a. A reflector 3 directs the light which issues from the lamp 3a against the gate 4 so that the image of a film frame which registers with the gate is projected onto a screen, not shown, when the circuit of the lamp 3a is completed.

The housing 1 contains a preferably automatic film threading unit having a friction wheel 5 mounted on an arm 6 which is pivotable about the axis of a vertical shaft 7 to move between the operative position shown in FIG. 1 and an inoperative or retracted position. The friction wheel 5 can be driven by the main motor of the projector or by a separate prime mover to rotate convoluted motion picture film 22 in the lowermost cassette 20' of a stack of cassettes 20 in a confining container here shown as an upright vertical duct 19. Each cassette has a window or cutout 20a through which the friction wheel 5 passes in response to pivoting of the arm 6 in a clockwise direction, as viewed in FIG. 1, whereby the friction wheel engages the outermost convolution of film 22 in the lowermost cassette 20' to rotate the supply reel 24 for convoluted film in a direction to pay out the film. The threading unit for motion picture film further comprises a deflector 8 which can be caused to enter the lowermost cassette 20' by way of the cutout 20a so as to engage the outermost convolution of film in front of the friction wheel 5. When the friction wheel 5 is driven to rotate the convoluted film, the leader of such film is deflected by the member 8 to enter a predetermined film path and to be ultimately attached to the core of a takeup reel 17. The deflector 8 is pivotable about the axis of a vertical shaft 9 which is mounted in the housing 1.

The housing 1 further accommodates a rewinding unit which also includes a friction wheel 10 mounted on an arm 11 which is pivotable about the axis of a vertical shaft 12. The friction wheel 10 can be introduced through a second cutout or window 20b in the lowermost cassette 20' and can be driven to rotate the supply reel 24 in the lowermost cassette 20' in a direction to collect the film 22. The guide means which guides the film 22 between the supply reel 24 in the lowermost cassette 20' and the takeup reel 17 comprises two rolls 14 and 15 which are respectively mounted on horizontal shafts 13 and 16. The main motor of the projector can drive the takeup reel 17 in a direction to collect the film 22. The shaft which is rotated by the main motor to drive the takeup reel 17 is indicated by the phantom line 18.

The aforementioned duct 19 is preferably detachable from the housing 1 and is mounted on the top wall of the housing. It can receive a predetermined number (for example, twelve) cassettes 20 in such positions that the lowermost cassette 20' of the stack maintains its cutouts 20a, 20b in the positions shown in FIG. 1, namely, to permit introduction of the friction wheels 5 and 10. The cassettes 20 of the stack in the duct 19 are located in horizontal planes, i.e., side-by-side. The vertical axis of the duct 19 is indicated in FIG. 3 by the phantom line 21. The direction in which the cassettes 20 are to be introduced into the duct 19 and in which the cassettes descend toward the projection position occupied by the lowermost cassette 20' is indicated by the arrow 33.

When a fresh cassette reaches the projection position (see the cassette 20' of FIG. 1), the threading unit including the friction wheel 5 is started, either by hand or automatically (for example, by a switch which is closed in response to descent of the next-to-the-lowermost cassette 20 to the projection position), whereby the friction wheel 5 co-operates with the deflector 8 to expel the leader of film 22 from the cassette 20' and to advance the leader into the range of the customary claw pull-down (not shown) which transports the film 22 stepwise to place successive frames of such film into registry with the gate 4. The takeup reel 17 is rotated by the shaft 18 when the leader of film 22 is attached to its core, and the projection of images of successive frames is then carried out in the customary way. The film 22 is thereupon rewound onto the supply reel 24 in the cassette 20' by the friction wheel 10 which can be moved to operative position by hand, in response to closing of a switch (not shown) or in automatic response to a signal which can be produced, for example, in response to increasing tension of the trailing portion of film 22 when the projection of images is completed and the takeup reel 17 continues to rotate in the direction to draw the film from the cassette 20'.

Figure 2:
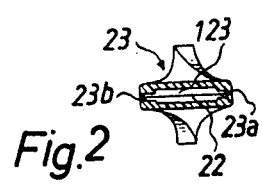
FIG. 2 is an enlarged fragmentary transverse vertical sectional view as seen in the direction of arrows from the line II—II of FIG. 1.

The aforementioned guide means which guides the film between the cutout 20a of the cassette 20' and the takeup reel 17 includes a channel 23 which is shown in detail in FIG. 2 and is designed to impart to the film 22 a 90° twist. The guide means further includes the aforementioned rolls 14, 15 and additional guide elements which insure that the leader of film 22 remains in the predetermined path during transport toward the core of the takeup reel 17. The manner in which the leader of film 22 can be automatically attached to the core of the takeup reel 17 is well known in the art of motion picture projectors. The friction wheel 5 can be returned to its inoperative or retracted position as soon as the leader of the film 22 reaches the aforementioned pull-down.

When the rewinding of film 22 onto the supply reel 24 in the cassette 20' occupying the projection position of FIG. 1 is completed, the cassette 20' is removed from the projection position in the direction indicated by an arrow 29 to allow the next cassette 20 of the stack in the duct 19 to descend by gravity and to assume the projection position. The means for expelling the cassette 20' from the lower end of the duct 19 is shown in FIG. 3. It comprises a pusher or transfer member 25 which is reciprocable in and counter to the direction indicated by arrow 29 by moving in suitable ways provided therefor on the housing 1. The front face 25a of the pusher 25 can engage the adjacent wall of the cassette 20' when the pusher moves from the retracted position of FIG. 3 to enter the duct 19 by way of a first opening 19a and to expel the cassette 20' through a second opening 19b located opposite the opening 19a. The means for reciprocating the pusher 25 comprises a toothed rack 25b which is rigid with the pusher, a pinion 26 which meshes with the rack 25b and is rotatable in the housing 1 on a horizontal shaft 27, and a drive for the pinion 26, e.g., a transmission which is driven by the main motor and includes an endless belt 28 trained over a pulley which is coaxial with the pinion 26.

The second opening 19b of the duct 19 is normally closed by a pivotable gate or flap 30 which yields when engaged by the adjacent surface of the moving cassette 20'. The hinge for the gate 30 is shown at 31. The thus expelled cassette 20' enters an intercepting receptacle 32 which is preferably detachable from the housing 1. The receptacle 32 can accommodate one or more cassettes 20 and can be emptied from time to time.

While the pusher 25 expels the lowermost cassette 20' from the projection position of FIG. 1, its top surface 25c prevents the next-following cassette 20 from descending by gravity and from reaching the projection position before the pusher completes its return stroke so that its front face 25a is located to the right of the opening 19a, as viewed in FIG. 3. The configuration of the duct 19 is preferably such that the cassette which descends by gravity upon retraction of the pusher 25 automatically assumes the projection position in which its cutouts 20a, 20b respectively permit entry of the friction wheel 5 and deflector 8 (cutout 20a) and friction wheel 10 (cutout 20b).

The drive means for the pusher 25 can be started by hand, e.g., by closing of a switch, or in response to a signal which can be generated by the rewinding unit, for example, in response to completion of the movement of friction wheel 10 to its retracted position. It is equally within the purview of the invention to omit the parts 25b, 26, 27, 28 and to provide the pusher 25 with a handle which can be grasped by hand to move the pusher forwardly and backwards and to thus expel the cassette 20' into the receptacle 32.

The duct 19 can be inserted into a suitable cutout in the top wall of the housing 1 to be held in requisite position by friction. Other means can be provided for releasably or detachably securing the duct 19 to the housing 1 in such position that the cassettes in the duct tend to descend by gravity and that one thereof automatically assumes the projection position when the pusher 25 is retracted. The lowermost cassette 20' in the projection position preferably extends in part into the housing or is surrounded by a portion of the top wall of the housing to insure that the projector can be used without the duct 19. Thus, when the duct 19 is detached, the operator can place a single cassette into the projection position because such position is preferably defined in part by the top wall of the housing 1. An advantage of the removable duct 19 and of the removable receptacle 32 is that the projector can be stored in a small space or carried around in a small case. The duct 19 and the receptacle 32 will be attached to the housing 1 only when it is desired to present two or more films, i.e., to project the images of frames on films which are stored in several cassettes.

The duct 19 need not completely surround the stack of cassettes 20. This duct can be provided with holes, cutouts, windows or like means which enable the user to determine the number of cassettes in the stack.

The aforementioned guide channel 23 for the film 22 in mounted in the housing 1 downstream of the deflector 8, as considered in the direction of film travel from the cutout 20a of the cassette 20' toward the takeup reel 17. This guide channel 23 is designed to twist the film 22 through 90° because the cassette 20' is located in a horizontal plane whereas the film gate 4 is vertical. The channel 23 preferably consists of suitable synthetic plastic material and defines a twisting passage 123 (see FIG. 2) which automatically twists the film 22 through 90 degrees when the leader of the film advances beyond the outlet of the channel. As shown in FIG. 2, the lateral or marginal portions 23a, 23b of the passage 123 in the channel 23 are narrower than the median portion of such passage so that the film 22 is engaged only along its edges to avoid scratching of or other damage to film frames. It was found that the channel 23 is capable of changing the orientation of film 22 without any damage and without jamming of the leader during transport through the passage 123.

An important advantage of the duct 19 is that it permits or causes successive cassettes 20 to assume the projection position under the action of gravity. Thus, the cassettes need not be pushed or pulled to projection position; this results in a substantial simplification of the projector and insures that the speed at which the lowermost cassette of an entire stack advances to projection position is substantially identical with the speed of the last or uppermost cassette. This is important when the descending cassettes are used to generate signals or to actuate certain elements which operate one or more projector units as a function of movement of successive cassettes to projection position.

It is clear that the improved projector is susceptible of many additional modifications. For example, the duct 19 (and/or the receptacle 32) may be permanently attached to the housing 1 and the illustrated upright duct can be replaced with a slightly or strongly inclined duct, as long as the cassettes of the stack in the duct are still capable of descending by gravity to insure that the lowermost cassette of the stack automatically assumes the projection position as soon as the pusher 25 or an analogous transfer member is retracted. Furthermore, the receptacle 32 can be omitted if the duct 19 is provided with an extension below the projection position so that the cassette 20' which is to leave the projection position need not move sideways but is permitted to descend by gravity to enter the extension of the duct. Still further, the cassette 20' which is to leave the projection position can be caused to descend into a chute, not shown, for sliding movement into a receptacle which is placed next to the housing 1 to intercept the descending cassette.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended:

1. In a motion picture projector for use with film-containing cassettes, a combination comprising a housing defining a first space for reception of one film-containing cassette at a time whereby the cassette which is received in said space occupies a predetermined projection position; a confining container separably connectable to said housing and defining a second space for storage of spare cassettes, said second space constituting an extension of said first space when said container is connected to said housing to allow for direct transfer of a spare cassette from said second space into said first space upon removal of a cassette from said first space and guide means for the film which is being withdrawn from a cassette occupying said projection position, said guide means comprising a channel for twisting the film through an angle of substantially 90°.

2. A combination as defined in claim 1, wherein said container is an upright duct.

3. A combination as defined in claim 1, wherein the cassette which occupies said projection position is located in a substantially horizontal plane.

4. A combination as defined in claim 1, further comprising transfer means provided on said housing and operative to expel a cassette from said projection position.

5. A combination as defined in claim 4, wherein said transfer means comprises a pusher which is reciprocable in a substantially horizontal plane to thereby expel a cassette from said first space while moving in a predetermined direction.

6. A combination as defined in claim 1, wherein said container is an upright duct which is arranged to accommodate and to at least partially surround a stack of superimposed cassettes.

7. A combination as defined in claim 6, further comprising transfer means for expelling cassettes from said projection position and a receptacle for collecting the thus expelled cassettes, said receptacle being provided on said housing.

8. A combination as defined in claim 7, wherein said receptacle is detachable from said housing.

9. In a motion picture projector for use with film-containing cassettes, a combination comprising a housing; a confining container connected with said housing and defining a space for reception and gravitational descent of cassettes to a predetermined projection position; guide means for the film which is being withdrawn from a cassette occupying said projection position, said guide means comprising a channel for twisting the film through an angle of substantially 90°; and a film gate mounted in said housing and located in a substantially vertical plane, said channel of said guide means being arranged to twist the film upstream of said gate.

10. In a motion picture projector for use with film-containing cassettes, a combination comprising a housing; a confining container connected with said housing and defining a space for reception and gravitational descent of cassettes to a predetermined projection position; guide means for the film which is being withdrawn from a cassette occupying said projection position, said guide means comprising a channel for twisting the film through an angle of substantially 90° and said channel defining a relatively wide passage for motion picture film, said passage having a pair of relatively narrow marginal portions for the edge portions of film which passes through said channel.

* * * * *